Patented May 13, 1952

2,596,886

UNITED STATES PATENT OFFICE 2,596,886

HYDROROSIN ACID SALTS IN THE EMULSION POLYMERIZATION OF STYRENES

Joseph N. Borglin, Wilmington, Del., and Philip A. Ray, Denver, Colo., assignors to Hercules Powder Company, Wilmington, Del., a corporation of Delaware No Drawing. Original application June 17, 1944, Serial No. 540,886. Divided and this application August 19, 1948, Serial No. 45,216

9 Claims. (Cl. 260—27)

This invention relates to an improved process for the emulsion polymerization of unsaturated compounds and, more particularly, to an improved process of polymerizing vinyl hydrocarbons to provide improved synthetic rubberlike materials.

It is well known that unsaturated compounds, particularly those containing the vinyl group, may be advantageously polymerized in aqueous emulsion. Synthetic rubberlike materials have been prepared by polymerizing in aqueous emulsion, butadiene hydrocarbons and compounds containing a vinyl group such as styrene, acrylic acid esters, acrylic acid nitrile, and the corresponding methacrylic acid derivatives. Polymers such as polyvinyl chloride, polyvinyl acetate, polystyrene, polymethyl methacrylate and various other addition polymers also have been prepared by polymerization in aqueous emulsion. Soaps of fatty acids are the most commonly used emulsifying agents for polymerizations of this type.

Fatty acid soaps, although effective emulsifying agents for the polymerization of vinyl compounds, are not sufficiently water-soluble and are, therefore, quite difficult to remove from the polymerization products. The presence of fatty acids in the polymer has many disadvantages. Their presence in transparent plastic materials causes cloudiness. In the case of rubberlike polymers, the fatty acid soap remaining in the polymer is converted to free fatty acid, when salt and acid are needed, as is commonly done, in the precipitation of the polymer. Fatty acids weaken the rubber and must, therefore, be removed from it and their complete removal is very difficult.

Now in accordance with this invention, it has been found that the alkali metal salts of hydrorosin acids may be used, with very advantageous effects, as emulsifying agents for the polymerization of compounds which are capable of being polymerized by a peroxide-type catalyst and which contain the group

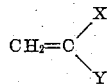

where X is selected from the group consisting of alkyl, alkenyl, alkadienyl, alkynyl, alkoxy, aryl, aryloxy, halogen, acyl, acyloxy and cyano and Y is selected from the group consisting of hydrogen, alkyl and aryl.

The alkali metal salts of hydrorosin acids have been found to be excellent emulsifying agents in the preparation of polymers by emulsion polymerization. They also have the advantage of being readily washed out of the polymer and, as a result, transparent plastic polymers prepared by this means are free from cloudiness. Furthermore, the presence of hydrorosin acids has been found to materially increase the tensile strength and tack in rubbery polymers, such as the copolymer of butadiene and styrene. The physical properties after cure of these polymers are also improved.

The following examples are illustrative of the preparation of polymers by emulsion polymerization and the products thereof in accordance with this invention. All parts given in the examples represent parts by weight.

Example I

Ten parts of dihydroabietic acid in 400 parts of water were neutralized with sodium hydroxide and 0.6 part of potassium persulfate, 1 part of lauryl mercaptan, 50 parts of styrene and 150 parts of butadiene were added. The mixture was agitated at 50° C. for 14 hours in a sealed container. The emulsion was then run into an open vessel containing 20 parts of a 2% aqueous solution of phenyl-β-naphthylamine and stripped of excess butadiene. The polymer was precipitated by the addition of an excess of a saturated salt solution, washed alkali-free with water, then washed with alcohol and finally dried to constant weight on a mill. A 69% yield of polymer was obtained.

Example II

This example was carried out exactly as described in Example I except that tetrahydroabietic acid was substituted for the dihydroabietic acid used in that example. A 78% yield of polymer was obtained.

Example III

To 400 parts of a 2½% aqueous solution of sodium tetrahydroabietate containing an excess of 200% of sodium hydroxide solution, 6 parts of potassium persulfate, 45 parts of styrene, 136 parts of butadiene and 1.6 parts of isoamyl alcohol were added. The mixture was agitated at 50° C. for 16 hours in a sealed container. An 82% yield of polymer was obtained by precipitation with a concentrated salt solution.

In order to compare the use of a purified hydrorosin acid soap with that of ordinary rosin soap, the following control was run: To 400 parts of a 2½% aqueous solution of rosin soap, prepared from N wood rosin and containing a 200% excess of sodium hydroxide were added 6 parts of potassium persulfate, 1.6 parts of isoamyl alcohol, 45 parts of styrene and 136 parts of butadiene. On carrying out the polymerization as described in the above example, a 23% yield of polymer was obtained. From these results it may be seen that the use of an alkali metal salt of a purified hydrorosin acid results in a greatly increased yield of polymer over that obtained by the use of rosin soap.

*Example IV*

This example was carried out exactly as described in Example III using sodium tetrahydroabietate except that isoprene was substituted for the butadiene used in that example. A 69% yield of polymer was obtained.

*Example V*

N wood rosin was distilled under a pressure of 2 mm. of mercury and the following fractions were collected: A light end of 12% was taken at a vapor temperature of about 250° C. and a second cut of 79% of the total charge was taken at a vapor temperature of about 300° C., leaving a residue of 8%.

The middle fraction of the distilled rosin was hydrogenated in the molten state at 235° C. with a Raney nickel catalyst and hydrogen at a pressure of 5000 pounds per square inch for 3 hours, i. e., until no further hydrogen absorption was apparent. The hydrogenated rosin was then dissolved in gasoline, filtered to remove the catalyst, and the gasoline removed by distillation. The hydrogenated rosin was saturated to the extent of about 65% of both double bonds.

Ten parts of this distilled hydrogenated rosin in 400 parts of water were neutralized with sodium hydroxide and 5.5 parts of tertiary-butyl hydroperoxide solution (60% peroxide), 50 parts of acrylonitrile, and 150 parts of butadiene were added. The mixture was agitated at 50° C. for 14 hours in a sealed container. The polymer was precipitated, washed, and dried as described in Example I. A 79% yield of butadiene-acrylonitrile polymer was obtained.

*Example VI*

Ten parts of tetrahydroabietic acid in 400 parts of water were neutralized with sodium hydroxide and 200 parts of styrene containing 0.2 part of benzoyl peroxide were added. The mixture was agitated in a nitrogen atmosphere at 50° C. for 16 hours in a sealed container. The polymer was precipitated, washed and then dried to constant weight in a vacuum oven at 60° C. A 90% yield of polymer was obtained.

The hydrorosin acid soaps described in accordance with this invention are prepared by the saponification of hydrorosin acids with an alkali metal compound, basic in nature. Alkali metal compounds suitable for this purpose are the hydroxides, carbonates, etc., of sodium, potassium, etc. The soap may be prepared in situ, i. e., the hydrorosin acid may be added to the monomeric material and a solution of alkali added, or the soap may be incorporated in the polymerization mass in the form of a paste, or in the form of a dry soap.

It will be understood that by purified hydrorosin acid is meant, in addition to the pure hydrorosin acids or mixtures thereof, a hydrogenated rosin, at least 50 per cent saturated with hydrogen, which has been purified by distillation, crystallization or other means to remove materials which inhibit polymerization with peroxide-type catalysts. It is well known that rosin is a mixture of isomeric rosin acids, the best known of which are abietic acid, sapinic acid and d-pimaric acid. The relative proportions in which these and the other isomeric rosin acids occur in a given sample of rosin depend on the source of the rosin. Thus, wood rosin contains more abietic acid than any of the other acids, while American gum rosin contains more sapinic acid and French gum rosin contains more d-pimaric acid. Any of these rosins may be treated to reduce their unsaturation and the hydrorosin acids produced are equivalent for the purpose of this invention. The several isomeric acids found in various types of rosin may be separated and hydrogenated in pure form or the hydrorosin acids may be separated after hydrogenation of the rosin, if desired.

The hydrogenation of rosin or rosin acids may be carried out by contacting the rosin or rosin acid in a fluid state with hydrogen in the presence of an active base metal hydrogenation catalyst, such as activated nickel, Raney nickel, copper-chromite, cobalt, etc., under pressure, for example 200 to 15,000 pounds per square inch, and at a temperature of about 125° to about 225° C. for about 0.5 to 5 hours. A highly active platinum or platinum oxide catalyst may also be employed, in which case the reaction is usually carried out at room temperature under relatively low pressure and in the presence of an inert reaction medium such as acetic acid. Many other variations of the hydrogenation reaction may be utilized.

As pointed out above, either gum or wood rosin or the rosin acids may be hydrogenated. The rosin may be refined prior to its hydrogenation, by any suitable method, as by distillation, heat-treatment with or without a catalyst, solvent refined as with furfural, phenol, etc., or treated with an absorbent as fuller's earth, activated carbon or refined by any other method.

While fatty acid soaps are the most commonly used soaps for emulsion polymerization reactions, they have many disadvantages as noted above. Ordinary rosin soaps, on the other hand, are not practical emulsifying agents for these reactions since they result in low yields of polymer. However, by using the soaps of hydrorosin acids as emulsifying agents, the yield of polymer is high at a satisfactory rate or comparable to that of the fatty acid soaps. These facts are clearly illustrated by the foregoing examples. In addition to these advantages the polymer formed is consistently more uniform in its tensile properties than when fatty acid soaps are used as the emulsifying agent.

In contrast to fatty acids which weaken synthetic rubbers, hydrorosin acids have been found to produce beneficial effects on these rubbers. The tensile strength, elongation, tack and other physical properties are improved by the presence of a hydrorosin acid in the polymeric material. An amount of hydrorosin acid up to about 10 per cent is particularly advantageous.

One means of incorporating small amounts of hydrorosin acids in a rubbery polymer is through the use of alkali metal salts of these acids as emulsifying agents in the preparation of the polymer as shown in the foregoing examples. By carrying out the polymerization in an aqeous emulsion in the presence of these soaps, the addition of acid and salt in the precipitation of the polymer precipitates the free hydrorosin acid in the polymer. The polymer may then be washed until from about 0 to about 5 per cent of hydrorosin acid remains in the polymer. This has the advantage of eliminating the necessity for washing the polymer completely free of the emulsifying agent, as has to be done in the case of fatty acid soaps, and at the same time permits a means of simply and uniformly incorporating a small amount of hydrorosin acid in the polymerized material. In fact, an additional amount of hydrorosin acid may be added to the polymer to provide an amount of up to about 10 per cent by weight of polymer, in order to take advantage of the improvements made by the presence of hydrorosin acids in the finished product.

The rubberlike polymers formed by emulsion polymerization of butadiene and styrene in the presence of hydrorosin acid soaps and containing, as a result thereof, an amount of a hydrorosin acid up to about 10 per cent, exhibit exceptionally high tensile strengths and elongations when compounded and vulcanized. The tack, building properties, and mill behavior in the unvulcanized state are also noticeably improved. The hydrorosin acid may, if desired, be washed completely out of the polymer, and the resulting polymer will still have an improved millability over that of a polymer prepared with a fatty acid soap.

The alkali metal salts of hydrorosin acids may be used alone or combined with fatty acid soaps as the emulsifying agent in polymerization by the emulsion technique. One of the advantages in using such a mixed emulsifying agent is that certain of the less expensive fatty acid soaps, which are themselves unsatisfactory for emulsion polymerizations, may be used when used in combination with a soap of a hydrorosin acid.

Compounds which may be advantageously polymerized in aqueous emulsion by means of the soaps of hydrorosin acids include butadiene and its hydrocarbon derivatives such as isoprene, dimethyl butadiene and phenyl butadiene, or other compounds containing the vinyl group such as styrene, α-methyl styrene, α-chloro styrene, α-cyano styrene, olefins, acylic terpenes, vinyl alkyl or aryl ethers, vinyl alkyl ketones, acrylic acid esters, methacrylic acid or esters, vinyl halides, vinyl esters, etc. The alkali metal salts of hydrorosin acids have been found to be excellent emulsifying agents, particularly in the preparation of the copolymers of butadiene and styrene or acrylonitrile, isoprene and styrene or acrylonitrile, and other rubberlike copolymers, as well as in the preparation of polymers such as polyvinyl chloride, polyvinyl acetate, polystyrene, polymethyl methacrylate, and the various other addition polymers which may be prepared by the emulsion technique.

The polymerizations in which hydrogenated rosin soaps are used may be subjected to the same variations in reaction conditions, for example, concentration of reactants, temperature, pressure, etc., as those in which a fatty acid soap is used. The temperature of the reaction may vary from about 20° to about 100° C., preferably from about 40° to about 60° C., and the concentration of the emulsifying agent may be varied from about 1 to about 5 per cent, usually about 2 to about 3 per cent is sufficient. The polymerization, in general, is carried out with the aid of a catalyst, such as a peroxide-type catalyst, potassium persulfate, etc. Hydrorosin acid soaps may also be used in combination with any desired initiator or other polymerization or processing aid.

This application is a division of our application for United States Letters Patent, Serial No. 540,886, filed June 17, 1944, now Patent Number 2,569,447.

What we claim and desire to protect by Letters Patent is:

1. The process which comprises polymerizing a monomeric material consisting of a styrene polymerizable with a peroxide catalyst and containing the $CH_2=C<$ group in aqueous emulsion in the presence of an alkali metal salt of a purified hydrorosin acid as the emulsifying agent.

2. The process which comprises polymerizing a monomeric material consisting of a styrene polymerizable with a peroxide catalyst and containing the $CH_2=C<$ group in aqueous emulsion in the presence of an alkali metal salt of a distilled hydrorosin acid as the emulsifying agent.

3. The process which comprises polymerizing a monomeric material consisting of a styrene polymerizable with a peroxide catalyst and containing the $CH_2=C<$ group in aqueous emulsion in the presence of an alkali metal salt of a crystallized hydrorosin acid as the emulsifying agent.

4. The process which comprises polymerizing a monomeric material consisting of a styrene polymerizable with a peroxide catalyst and containing the $CH_2=C<$ group in aqueous emulsion in the presence of an alkali metal salt of a hydroabietic acid as the emulsifying agent.

5. The process which comprises polymerizing a monomeric material consisting of a styrene polymerizable with a peroxide catalyst and containing the $CH_2=C<$ group in aqueous emulsion in the presence of sodium dihydroabietate as the emulsifying agent.

6. The process which comprises polymerizing a monomeric material consisting of a styrene polymerizable with a peroxide catalyst and containing the $CH_2=C<$ group in aqueous emulsion in the presence of sodium tetrahydroabietate as the emulsifying agent.

7. The process which comprises polymerizing a monomeric material consisting of styrene in aqueous emulsion in the presence of an alkali metal salt of a purified hydrorosin acid as the emulsifying agent.

8. The process which comprises polymerizing a monomeric material consisting of styrene in aqueous emulsion in the presence of sodium tetrahydroabietate as the emulsifying agent.

9. The process which comprises polymerizing a monomeric material consisting of styrene in aqueous emulsion in the presence of sodium dihydroabietate as the emulsifying agent.

JOSEPH N. BORGLIN.
PHILIP A. RAY.

REFERENCES CITED

The following references are of record in the file of this patent:

UNITED STATES PATENTS

| Number | Name | Date |
|---|---|---|
| 2,005,295 | Meisenburg | June 18, 1935 |
| 2,029,410 | Carothers et al. | Feb. 4, 1936 |
| 2,264,173 | Collins | Nov. 25, 1941 |
| 2,338,517 | Kitani et al. | Jan. 4, 1944 |
| 2,338,477 | Fryling | Nov. 6, 1945 |
| 2,388,600 | Collins | Nov. 6, 1945 |

OTHER REFERENCES

Mark et al.: High Polymeric Reactions, Interscience, 1941, pages 81 to 83 and 329.